(12) United States Patent
Wang

(10) Patent No.: US 9,550,170 B2
(45) Date of Patent: Jan. 24, 2017

(54) SYNTHESIS OF NANOPARTICLES USING ETHANOL

(71) Applicant: Brookhaven Science Associates, LLC, Upton, NY (US)

(72) Inventor: Jia Xu Wang, East Setauket, NY (US)

(73) Assignee: Brookhaven Sciecne Associates, LLC, Upton, NY (US)

( * ) Notice: Subject to any disclaimer, the term of this patent is extended or adjusted under 35 U.S.C. 154(b) by 798 days.

(21) Appl. No.: 13/860,316

(22) Filed: Apr. 10, 2013

(65) Prior Publication Data

US 2013/0264198 A1 Oct. 10, 2013

Related U.S. Application Data

(60) Provisional application No. 61/622,374, filed on Apr. 10, 2012.

(51) Int. Cl.
*B22F 9/24* (2006.01)
*B22F 1/00* (2006.01)
(Continued)

(52) U.S. Cl.
CPC ............. *B01J 23/462* (2013.01); *B01J 13/02* (2013.01); *B01J 23/44* (2013.01); *B22F 1/0018* (2013.01);
(Continued)

(58) Field of Classification Search
CPC ..... B22F 1/0018; B22F 1/0022; B22F 1/0025; B22F 1/0044; B22F 1/0048; B22F 1/0055; B22F 1/02; B22F 1/025; B22F 2001/0029; B22F 2001/0033; B22F 2001/0037; B22F 2301/25; B22F 2301/255; B22F 2303/30; B22F 2304/05; B22F 2304/052; B22F 2304/056; B22F 2304/058;B22F 2998/00; B22F 2998/10; B22F 9/16; B22F 9/18; B22F 9/24; H01M 4/9058; H01M 4/926; B32B 15/01; B32B 15/011; B32B 15/012; B32B 15/013; B32B 15/015; B32B 15/016; B32B 15/017; B32B 15/018; B32B 15/043; B32B 2264/105; B32B 2264/12; B32B 2311/02; B32B 2311/04; B32B 2311/06; B32B 2311/08; B32B 2311/09; B01J 13/02; B01J 23/38; B01J 23/40; B01J 23/42; B01J 23/44; B01J 23/46; B01J 23/462; B01J 23/464; B01J 23/466; B01J 23/468; B01J 23/48; B01J 23/50; B01J 23/52; B01J 23/56; B01J 23/66; B01J 23/89; B01J 23/8906; B01J 23/8913; B01J 23/892; B01J 23/8926
See application file for complete search history.

(56) References Cited

U.S. PATENT DOCUMENTS 2,621,137 A * 12/1952 Miller .................. B22F 1/0088
148/513
7,425,647 B2 * 9/2008 Lemanski ............... B01J 21/08
502/245
(Continued)

OTHER PUBLICATIONS

F. Bonet et al., "Synthesis of monodisperse Au, Pt, Pd, Ru and Ir nanoparticles in ethylene glycol." Nanostructured M Nanostructured Materials, 11(8), 1277-1284 (Nov. 1999). doi: 10.1016/S0965-9773(99)00419-5.
(Continued)

*Primary Examiner* — Scott Kastler
*Assistant Examiner* — Vanessa Luk
(74) *Attorney, Agent, or Firm* — Dorene M. Price; Lars O. Husebo

(57) ABSTRACT

The present disclosure relates to methods for producing nanoparticles. The nanoparticles may be made using ethanol
(Continued)

as the solvent and the reductant to fabricate noble-metal nanoparticles with a narrow particle size distributions, and to coat a thin metal shell on other metal cores. With or without carbon supports, particle size is controlled by fine-tuning the reduction power of ethanol, by adjusting the temperature, and by adding an alkaline solution during syntheses. The thickness of the added or coated metal shell can be varied easily from sub-monolayer to multiple layers in a seed-mediated growth process. The entire synthesis of designed core-shell catalysts can be completed using metal salts as the precursors with more than 98% yield; and, substantially no cleaning processes are necessary apart from simple rinsing. Accordingly, this method is considered to be a "green" chemistry method.

11 Claims, 12 Drawing Sheets

(51) Int. Cl.
| | | |
|---|---|---|
| *B01J 23/46* | (2006.01) | |
| *B22F 9/18* | (2006.01) | |
| *B01J 23/44* | (2006.01) | |
| *B22F 1/02* | (2006.01) | |
| *B82Y 30/00* | (2011.01) | |
| *H01M 4/92* | (2006.01) | |
| *B01J 13/02* | (2006.01) | |
| *B32B 15/02* | (2006.01) | |
| *B82Y 40/00* | (2011.01) | |

(52) U.S. Cl.
CPC ............... *B22F 1/025* (2013.01); *B22F 9/18* (2013.01); *B22F 9/24* (2013.01); *B32B 15/02* (2013.01); *B82Y 30/00* (2013.01); *H01M 4/926* (2013.01); *B22F 2998/10* (2013.01); *B82Y 40/00* (2013.01); *Y02E 60/50* (2013.01)

(56) References Cited

U.S. PATENT DOCUMENTS

| | | | | |
|---|---|---|---|---|
| 7,803,734 | B2 * | 9/2010 | Majima | ............ B01J 23/42 502/184 |
| 2002/0132154 | A1 | 9/2002 | Adzic et al. | |
| 2003/0039857 | A1 * | 2/2003 | Zhang | ............ A62D 3/34 428/655 |
| 2004/0018414 | A1 | 1/2004 | Adzic et al. | |
| 2006/0134505 | A1 | 6/2006 | Wang et al. | |
| 2006/0135359 | A1 | 6/2006 | Adzic et al. | |
| 2006/0177728 | A1 | 8/2006 | Adzic et al. | |
| 2006/0263675 | A1 | 11/2006 | Adzic et al. | |
| 2007/0026292 | A1 | 2/2007 | Adzic et al. | |
| 2007/0031722 | A1 | 2/2007 | Adzic et al. | |
| 2007/0264189 | A1 | 11/2007 | Adzic et al. | |
| 2008/0050641 | A1 | 2/2008 | Dressick et al. | |
| 2008/0050642 | A1 | 2/2008 | Dressick et al. | |
| 2008/0051281 | A1 | 2/2008 | Dressick et al. | |
| 2008/0220296 | A1 * | 9/2008 | Eichhorn | ............ B01J 23/462 429/437 |
| 2009/0068505 | A1 | 3/2009 | Adzic et al. | |
| 2010/0097742 | A1 | 4/2010 | Adzic et al. | |
| 2010/0099012 | A1 | 4/2010 | Adzic | |
| 2010/0129728 | A1 * | 5/2010 | Morimoto | ............ B01J 23/002 429/483 |
| 2010/0177462 | A1 | 7/2010 | Adzic et al. | |
| 2010/0197490 | A1 | 8/2010 | Adzic et al. | |
| 2010/0216632 | A1 | 8/2010 | Adzic et al. | |
| 2010/0222206 | A1 * | 9/2010 | Konishi | ............ H01M 4/92 502/101 |
| 2011/0129763 | A1 * | 6/2011 | Lee | ............ B22F 1/025 429/532 |
| 2011/0151356 | A1 | 6/2011 | Adzic et al. | |
| 2011/0155579 | A1 | 6/2011 | Wang et al. | |
| 2012/0109287 | A1 | 5/2012 | Srivastava et al. | |
| 2012/0245017 | A1 | 9/2012 | Adzic et al. | |
| 2012/0245019 | A1 | 9/2012 | Adzic et al. | |
| 2013/0034803 | A1 | 2/2013 | Adzic et al. | |
| 2013/0045328 | A1 | 2/2013 | Adzic et al. | |
| 2013/0056359 | A1 | 3/2013 | Adzic et al. | |
| 2013/0177715 | A1 | 7/2013 | Adzic et al. | |
| 2013/0177838 | A1 | 7/2013 | Wang et al. | |
| 2013/0178357 | A1 | 7/2013 | Adzic et al. | |
| 2013/0281285 | A1 | 10/2013 | Kotaro et al. | |

OTHER PUBLICATIONS

R. R. Adzic et al., "Platinum Monolayer Fuel Cell Electrocatalysts." Top Catal., 46(3), Top Catal., 46(3), 249262 (2007). Published online: Nov. 27, 2007; doi: 10.1007/s11244-007-9003-x.

S. Alayoglu et al., "RuPt coreshell nanoparticles for preferential oxidation of carbon monoxide in hydrogen." Nature Mat. 7, 333-Nature Mat. 7, 333-338 (2008). Published online: Mar. 16, 2008; doi:10.1038/nmat2156.

S. Alayoglu et al., "Structural and Architectural Evaluation of Bimetallic Nanoparticles: A Case Study of Pt—Ru Core-Shell and Alloy Nanoparticles." ACS Nano. 3(10), 31 ACS Nano. 3(10), 3127-37 (2009). Published online: Sep. 4, 2009; doi: 10.1021/nn900242v.

A. U. Nilekar et al., "Preferential CO Oxidation in Hydrogen: Reactivity of Core-Shell Nanoparticles." J. Am. Chem. Soc., 13" J. Am. Chem. Soc., 132(21), 74187428 (2010). Published online: May 11, 2010; doi: 10.1021/ja101108w.

C. Wang et al., "Synthesis of Homogeneous Pt-Bimetallic Nanoparticles as Highly Efficient Electrocatalysts." ACS Catal., 1(1" ACS Catal., 1(10), 13551359 (2011). Published online: Aug. 25, 2011; doi: 10.1021/cs200328z.

J. X. Wang et al., PowerPoint presentation for the 2012 MRS Spring Meeting & Exhibit, titled "Green Synthesis for Green Energy: Core-shell Metal Nanocatalysts Synthesiz"Green Synthesis for Green Energy: Core-shell Metal Nanocatalysts Synthesized Using Ethanol for Applications in Fuel Cells and Water Electrolyzers," presentation given Apr. 11, 2012."

J. X. Wang et al., abstract for the 2012 MRS Spring Meeting & Exhibit, titled "Green Synthesis for Green Energy: Core-shell Metal Nanocata"Green Synthesis for Green Energy: Core-shell Metal Nanocatalysts Synthesized Using Ethanol for Applications in Fuel Cells and Water Electrolyzers," presentation given Apr. 11, 2012, last accessed at http://www.mrs.org/s12-program-u/#" presentation given Apr. 11, 2012, last accessed at http://www.mrs.org/s12-program-u/#tab2 on Feb. 1, 2016.

* cited by examiner

SYNTHESIS OF NANOPARTICLES USING ETHANOL

CROSS-REFERENCE TO A RELATED APPLICATION

This application claims the benefit under 35 U.S.C. 119(e) of U.S. Provisional Application No. 61/622,374 filed on Apr. 10, 2012, the disclosure of which is incorporated herein in its entirety.

STATEMENT OF GOVERNMENT RIGHTS

This invention was made with Government support under contract number DE-AC02-98CH10886, awarded by the U.S. Department of Energy. The Government has certain rights in the invention.

FIELD OF THE INVENTION

This disclosure relates to nanoparticle processing. In particular, it relates to methods of synthesizing noble metal nanoparticles and applications of the nanoparticles so produced.

BACKGROUND

Active, durable metal nanocatalysts with low platinum (Pt) content are desired for commercializing fuel cells, and for lowering the cost of hydrogen generators through water electrolysis. While several core-shell nanoparticles with a narrow distribution of particle size have displayed high catalytic performance, methods to produce them in large quantity, uniformly and inexpensively are essential for marketing them.

Core-shell nanocatalysts have been made mainly by (1) Pt galvanic replacement of an underpotentially deposited (UPD) Cu monolayers, and (2) forming a Pt-rich shell through high-temperature annealing or acid leaching of Pt-bimetallic alloy particles. To narrow down the spread of particle size, surfactants or capping agents were used during wet-chemical syntheses.

The synthesis of monodispersed noble metal nanoparticles using ethylene glycol as the solvent and reducing agent was reported in 1999. PVP was used as capping agent in synthesizing nanoparticles of Pt, Pd, Au, Ru, and Ir at various temperatures ranging from 100° C. to 150° C.

Multiple processes have been used in preparing catalysts, often involving costly or poisonous agents. For example, a recent study prepared monodispersed Pt-bimetallic alloy nanocatalysts, $Pt_3M$ (where M=Fe, Ni, or Co) by an organic solvothermal method in several steps. First, metal salts were dissolved in organic solvents with various surfactants and reduced at elevated temperatures. Next, the metal nanoparticles were separated by centrifuge, washing, and then mixed with carbon black. After drying, the catalysts were heated in an oxygen-rich atmosphere to remove the surfactants. Finally, they further were annealed in a reducing atmosphere to eliminate surface oxides. Hence, simpler procedures employing only inexpensive, environmentally benign agents are highly desirable.

SUMMARY

The present disclosure relates to methods for producing nanoparticles. The nanoparticles may be made using ethanol as the solvent and the reductant to fabricate noble-metal nanoparticles with a narrow particle size distributions, and to coat a thin metal shell on other metal cores. With or without carbon supports, particle size is controlled by fine-tuning the reduction power of ethanol, by adjusting the temperature, and by adding an alkaline solution during syntheses. The thickness of the added or coated metal shell can be varied easily from sub-monolayer to multiple layers in a seed-mediated growth process. The entire synthesis of designed core-shell catalysts can be completed using metal salts as the precursors with more than 98% yield; and, substantially no cleaning processes are necessary apart from simple rinsing. Accordingly, this method is considered to be a "green" chemistry method.

In one aspect, the disclosure relates to a method for producing nanoparticles. The method includes: dissolving a first metal salt in ethanol, heating the combination of the first metal salt and the ethanol to a first temperature sufficient to partially reduce first metal ions of the first metal salt, adding an alkaline solution, to fully reduce the first metal ions, thereby causing precipitation of nanoparticles. The first temperature may be between about 50° C. and about 120° C.

In another aspect, the disclosure relates to a method for producing atomically ordered core-shell nanoparticles. The method includes: combining nanoparticle cores comprising a first metal and a second metal salt with ethanol, heating the combination of the nanoparticle cores, second metal salt, and the ethanol to a second temperature high enough to substantially fully reduce second metal ions of the second metal salt onto the nanoparticle cores and form a conformal shell of second metal around the nanoparticle cores. In various aspects, the second temperature is also sufficiently low to prevent formation of second metal nanoparticles.

In various aspects, the disclosure also includes a method for producing atomically ordered core-shell nanoparticles. The method includes: dissolving a first metal salt in ethanol, heating the combination of the first metal salt and the ethanol to a first temperature sufficient to partially reduce first metal ions of the first metal salt, adding an alkaline solution, to fully reduce the first metal ions, thereby causing precipitation of nanoparticles. The first temperature may be between about 50° C. and about 120° C. The method further provides for combining the nanoparticle cores and a second metal salt with ethanol, heating the combination of the nanoparticle cores, second metal salt, and the ethanol to a second temperature high enough to substantially fully reduce second metal ions of the second metal salt onto the nanoparticle cores and form a conformal shell of second metal around the nanoparticle cores. In various aspects, the second temperature is also sufficiently low to prevent formation of second metal nanoparticles.

In additional aspects, the nanoparticle cores are annealed in hydrogen or hydrogen mixed with inert gas at between about ° C. and about 500° C. or about 0.5 hours to about 3 hours before the metal shell is formed on the nanoparticle core.

The described embodiments of organic photovoltaic devices of the disclosure, which are to be read in conjunction with the accompanying drawings, are illustrative only and not limiting, having been presented by way of example only to describe the invention. As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto.

DETAILED DESCRIPTION

The present disclosure relates to methods for producing nanoparticles. The nanoparticles may be made by using ethanol as a solvent and reducing agent. Thus, it is possible to form noble-metal nanoparticles with narrow particle size distributions. Furthermore, the nanoparticles may be formed that have a core of a first metal and a thin shell of a second metal.

Figure 1:
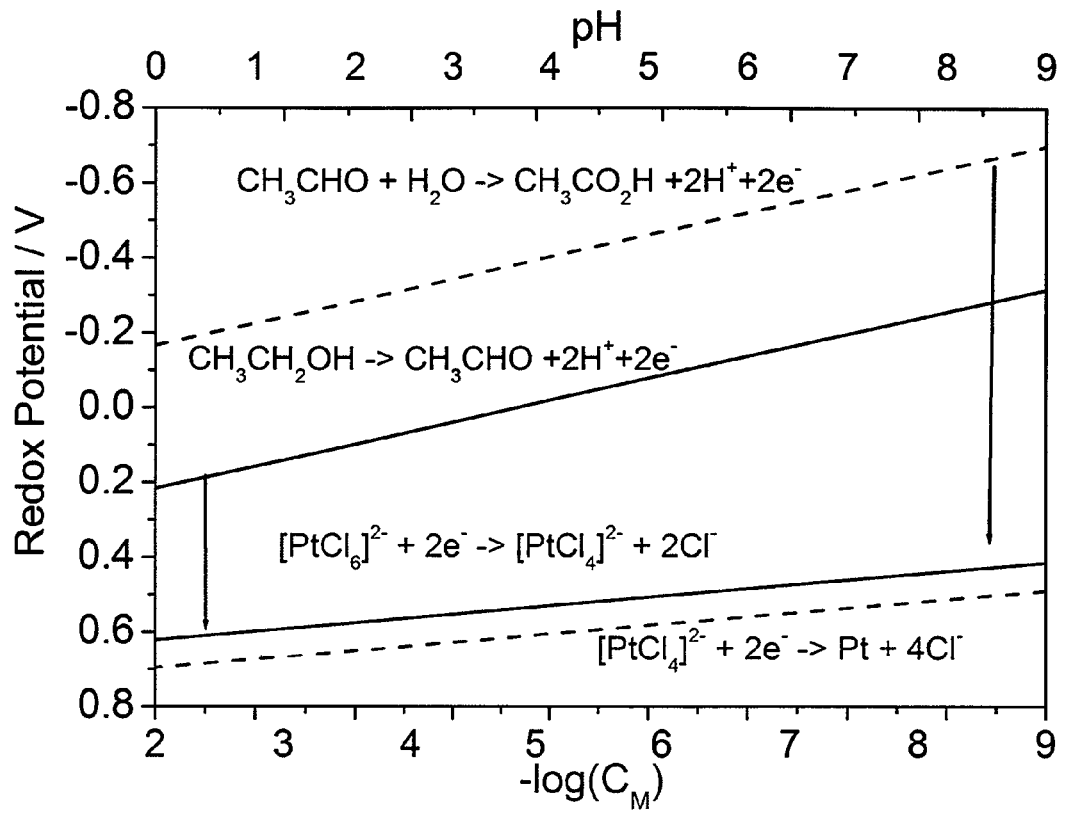
FIG. 1 depicts the standard reduction potential for ethanol and $[PtCl_6]^{2-}$ as a function of pH and metal ion concentration.

It has been found that ethanol may serve as both a solvent and a reducing agent of metals in metal salts. FIG. 1 depicts the standard reduction potential of ethanol, as well as the reduction potential of $[PtCl_6]^{2-}$. As a reductant, ethanol itself is oxidized in two steps (Eq. 1):

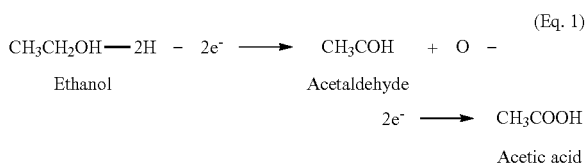

In the first step two protons are removed and in the second step one oxygen is added. The top pair of lines in FIG. 1 shows the 2e$^-$ pH-dependent standard reduction potential for both steps of the ethanol oxidation. The more negative the redox potential is, the higher is the reducing power. The standard reduction potentials are low enough for reducing noble metals typically used for electrocatalysis, such as, Ru, Rh, Pd, Os, Ir, Pt, and Au.

It has also been found that ethanol's reducing power can be enhanced and fine-tuned by adding alkaline solution to neutralize the protons from ethanol oxidation. Adding H$_2$O provides oxygen and enables the second step. Furthermore, the OH$^-$ of the alkaline solution reacts with the protons given off from both of the oxidation steps, thus further driving both the redox reactions. Thus, the addition of alkaline solutions may be used to control the reducing power of ethanol during synthesis for various purposes. The larger a potential gap with a metal precursor is, the easier the metal reduction occurs. The addition of the alkaline solution can make the residual of metal precursor negligible at the end of synthesis. It is also noted that the intermediate, acetaldehyde, is less stable, and is a stronger reductant than ethanol.

Thus, the first two-electron ethanol oxidation has a high activation barrier, which allows for a uniform ethanol solution containing partially reduced metal precursors stable at room temperature. For example, Ru$^{3+}$ may be reduced to Ru$^{2+}$ by the first two-electron oxidation of ethanol. This solution is stable for weeks at room temperature; there is no nucleation in the absence of water. However, upon the addition of an aqueous alkaline solution, the acetaldehyde's oxidation is enabled, which triggers Ru nucleation in a very uniform manner, and thus, results in a narrow particle size distribution.

Metal salts used may be any suitable salts based on Ru, Rh, Pd, Os, Ir, Pt, and Au metals. Combinations of salts may also be used. In certain embodiments the metal salts are based on Ru, Pd, Pt, or combinations thereof. For example, the metal salts may be selected from ruthenium (III) chloride trihydrate, palladium (II) chloride, and chloroplatinic acid hexahydrate. Other suitable salts may include chloroauric acid, chloroiridic acid, iridium(III) chloride, osmium chloride, and rhodium (III) chloride.

The metal salts may be added to the ethanol in concentrations ranging from about 1 mM to 50 mM, such as for example from about 1 mM to 10 mM. In certain embodiments anhydrous (200 proof) ethanol is used.

The ethanol may be heated to provide energy to overcome the activation barrier of the first two-electron ethanol oxidation. The ethanol and salt combination may be heated to temperatures between about 40° C. and about 150° C., such as between about 50° C. and about 120° C. In certain embodiments the temperature is about 80° C. and in other embodiments about 110° C.

The two-electron ethanol oxidation may take between about 10 minutes and several hours, such as between about 0.5 hours and about 2 hours. Typically, a color change may be observed. For example, the $Ru^{3+}$ to $Ru^{2+}$ reduction can be followed by monitoring the color going from brown ($Ru^{3+}$) to green ($Ru^{2+}$) over a period of about 1 hour.

The final oxidation step may be triggered by the addition of an aqueous alkaline solution. Suitable aqueous alkaline solutions include sodium hydroxide (NaOH) solutions, potassium hydroxide (KOH) solutions. The aqueous alkaline solutions may have Molar concentrations between about 0.05 M and about 1.0 M, such as between about 0.1 M and about 0.2 M. Upon the addition of the aqueous alkaline solution the metal ions of the metal salt are fully reduced and form a nanoparticle core of the first metal. The nanoparticle cores may be rinsed with water, ethanol or other suitable solvent.

After formation, the nanoparticle core may then be annealed at temperatures ranging between about 350° C. and about 500° C. The annealing may be performed for between about 0.5 hours and about 2 hours, such as for example 1 hour. The annealing may be performed under hydrogen gas or a mixture of hydrogen and argon or nitrogen.

In certain embodiments the nanoparticle cores may be produced in the presence of a support. The support can be any suitable support. For example, the support can be carbon, carbon nanotubes, fullerenes, alumina, silica, silica-alumina, titania, zirconia, calcium carbonate, barium sulphate, a zeolite, interstitial clay, and the like. For the embodiments where a support is used, the support may be added to the ethanol solution before or after the partial reduction of the first metal salt.

The nanoparticle core (either annealed or not and/or on support or not) may then be added to a second solution of a second metal salt in ethanol. The second metal salt may be any of the suitable salts mentioned above. However, to form a core-shell nanoparticle the second metal salt may have a different metal than the metal of the first metal salt. In other words, to form or add a thin shell coating on the nanoparticle core, a second metal salt different than the first metal salt is used.

The ethanol may then be heated to a temperature meeting two parameters. The desired temperature is sufficiently high to fully reduce the second metal ions of the second metal salt onto the nanoparticle cores, yet sufficiently low to prevent formation of second metal nanoparticles, such as between about 50° C. and about 150, ° C., or about 50° C. and about 80, ° C. In certain embodiments the temperature is about 80° C.

At the desired temperature a conformal shell will form around the nanoparticle core. By varying the amount and concentration of the second metal salts, it is possible to form conformal shells that are atomic monolayers, bilayers, or trilayers. Shell formation may occur without the addition of an aqueous alkaline solution. However, aqueous alkaline solution may be added towards the end of the shell formation in order to accelerate the metal reduction towards completion.

The resulting core-shell nanoparticles may be atomically ordered, in that they form particles that have distinct cores and distinct shells, with minimal or no migration between metal atoms between core and shell.

The core-shell nanoparticles may have average particle size diameters of between about 1 nm and about 10 nm, such as between about 2 nm and about 6 nm.

The core-shell nanoparticles made according to the method described herein may be well suited as catalysts for hydrogen evolution reactions. For example, RuPt and PdPt core-shell nanoparticles have been found to exhibit excellent catalytic performances at ultra-low metal loading for hydrogen evolution in water electrolyzers. Additionally, RuPt and PdPt core-shell nanoparticles have been found to be stable during oxygen reduction reactions, practically remaining unchanged, and with cyclic voltammetry curves showing negligible loss of electrochemical surface area.

Examples

The following materials were used: anhydrous ethanol (200 proof, ACS/USP Grade, Pharmco Aaper), ruthenium (III) chloride trihydrate (technical grade, Aldrich), chloroplatinic acid hexahydrate (ACS reagent, ≥37.50% Pt basis, Sigma-Aldrich), palladium (II) chloride (≥99.9%, Aldrich), commercial carbon-supported Pd nanoparticles (30 wt % Pd/C, NEC), sodium hydroxide (reagent grade, 97%, powder, Sigma-Aldrich) and potassium hydroxide (semiconductor grade, pellets, 99.99% trace metals basis, Sigma-Aldrich). MilliQ ultrapure deionized water (18.2 MΩ, Millipore UV Plus) was used to prepare all aqueous solutions and to rinse off anions after filtering synthesized nanocatalysts. Ketjenblack EC-600JD (AkzoNobel) and OH-functionalized carbon nanotubes (15 nm in diameter, CheapTubes) were used as the carbon supports. MilliQ ultrapure deionized water (18.2 MΩ, Millipore UV Plus) was used to prepare all aqueous solutions in syntheses and electrochemical measurements. The electrolytes used in electrochemical measurements were prepared with optima grade perchloric acid (Fisher Scientific). Oxygen gas (research purity, Matheson Tri-Gas), argon gas (4.8 grade, BNL) and hydrogen gas (extra dry grade, 99.95 PCT, GTS Welco) were used to saturate the electrolytes.

Synthesis of Unsupported Ru Nanoparticles:

In a typical synthesis of unsupported Ru nanoparticles, a 50 mL ethanol solution containing 150 μmol $RuCl_3$ was refluxed at 110° C. for 1 hour under rigorous stirring. The solution's color turned from brown to greenish reflecting the partial reduction of $Ru^{3+}$ to $Ru^{2+}$. Thereafter, 4.5 mL 0.1 M aqueous NaOH solution (450 μmol=3 times of 150 μmol of $RuCl_3$) was added, enabling a further reduction to metallic Ru nanoparticles. After 2 hours, the complete reduction of Ru ions was ensured by raising the pH to neutral with a little extra alkaline solution (<200 μmol). The mixture was cooled down to room temperature, filtered out, rinsed and dried.

Synthesis of Carbon-Supported Ru Nanoparticles:

In a typical synthesis of carbon-supported Ru nanoparticles, 100 mL ethanol solution containing 400 μmol $RuCl_3$ was refluxed at 110° C. with rigorous stirring for 1 h in a three-necked flask; meanwhile, 200 mg carbon powder or carbon nanotubes were disbursed in 60 mL ethanol by sonication for 20 min. The slurry was transferred into the reaction flask with additional 10 mL ethanol to assure a complete transfer. After the temperature stabilized at 110° C., 12 mL of a 0.2 M aqueous alkaline solution of 1200 (3×400) μmol NaOH was injected while stirred vigorously. After 2 h, the color of the solution was checked. If it was not completely colourless, additional 0.5×400=200 μmol NaOH was added. The heater was turned off, allowing the mixture to cool slowly in the oil bath to room temperature before filtering.

Coating Shell Metal onto Ru Core Nanoparticles:

In a typical synthesis of Ru@Pt core-shell nanoparticles, an as-synthesized Ru/C (400 μmol Ru) sample was annealed in $H_2$ at 450 C for 1 hour, then dispersed in 100 mL ethanol and refluxed at 110° C. for 1 h. After cooling down to room temperature, 8 mL of 50 mM $H_2PtCl_6$ (400 μmol) ethanolic solution was added with vigorous stirring or sonication to ensure a uniform dispersion. The mixture was heated to 80° C. and maintained there for 2 hours. The solution usually became colorless; if not, up to 3×400 μmol NaOH was added to ensure the complete reduction of Pt. The mixture was cooled down to room temperature, filtered, and rinsed with copious amount of water to eliminate the $Cl^-$ ions. The synthesized sample had a 1:1 Ru:Pt atomic ratio, along with 25 wt % Pt and 37 wt % Pt+Ru on carbon supports.

Coating Shell Metal onto Core Pd Nanoparticles:

In a typical synthesis of Pd@Pt core-shell nanoparticles, 30 mL ethanol containing 60 mg Pd/C (30 wt %, 169 μmol Pd) was mixed with 50 mM ethanolic $H_2PtCl_6$ solution (62.6 μmol Pt, pH ~2, yellow) with rigorous magnetic stirring at room temperature. After the mixture was confirmed to be uniform, it was heated to and refluxed at 80° C. for 1~2 hours. The reaction progress was checked by the color of supernatant. After the solution color faded away, 125.2 (2×62.6) μmol of aqueous 0.2 M NaOH solution was added with additional refluxing at 80° C. for 0.5 hour, to ensure the complete reduction of Pt. Then the mixture was cooled down, filtered out, washed with copious water to eliminate $Cl^-$ ions, and dried at room temperature under vacuum. The Pt and Pd weight percentages were determined by ICP-MS and EDX to be 17% and 25%, respectively, consistent with the calculated 1:2.7 Pt:Pd atomic ratio based on the amount of metal precursors.

In the control experiment of Pd shell coating on Pd/C nanoparticles, ethanolic $PdCl_2$ solution was used instead of $H_2PtCl_6$ solution. The procedure and reaction conditions were similar to those for Pd@Pt nanoparticles. The Pd atomic ratio was 1:4 for shell:core.

Characterization

Scanning transmission electron microscopy (STEM) measurements were performed using a Hitachi HD2700C operated at 200 kV, equipped with a cold field emission electron source and a probe aberration corrector. In a vibration-isolated and temperature-stabilized room, the spatial resolution for imaging is about 1.0 Å. The probe current was in 50-100 pA range. The sample for STEM was prepared by drop casting the ethanolic suspension of carbon-supported nanoparticles on a carbon-coated copper grid (Lacey carbon support film, 300 mesh, Ted Pella Inc.).

The $Z^n$-contrast (Z is the atomic number and n is approximately 1.7) STEM images were taken using a high angle annular dark-field (HAADF) detector, and elementary line scans were made with a high resolution EELS detector (Gatan Enfina-ER). We employed a convergence semi-angle of 28 mrad. With an energy dispersion of 0.3 eV per channel and a collection semi-angle of 20 mrad, the energy resolution is around 0.45 eV. The exposure time for each spot was about 0.07 s with a step size of 0.9 Å for EELS line scans. We extracted the Ru EELS signal from the EELS spectrum using a power-law background model and an integration window at the Ru $M_{4,5}$ edge (3, 4). TEM images were also taken with a JEOL 3000F TEM operating at 300 kV equipped with Gatan image filter system.

X-ray diffraction (XRD) experiments were carried out on beamline X7B (λ=0.3196 Å) of the National Synchrotron Light Source at Brookhaven National Laboratory. Two dimensional powder patterns were collected with a Perkin-Elmer image plate detector, and the diffraction rings were integrated using the FIT2D code. Lanthanum hexaboride (LaB6) was used as the instrumental reference. We refined the fits to the XRD peaks based Pseudo-Voigt function (the combination function of Gaussian and Lorentz functions) using Trust-Region method.

Computational Method

The calculations were performed by using periodic DFT as implemented in the Vienna ab-initio simulation package (VASP) (5, 6). Ion-core electron interactions were described using the projected augmented wave method (PAW) (7, 8), and Perdew-Wang functional (GGA-PW91) within the generalized gradient approximation (GGA) (9, 10) was used to describe exchange-correlation effects. The cutoff energy of plane-wave basis set was 400 eV. The five- or six-layer slab models have four atoms in a (2×2) hexagonal array within each layer and a vacuum of 12 Å between the slabs. The 9×9×1 k-points using the Monkhorst-Pack scheme (11) and first-order Methfessel-Paxton smearing (12) of 0.2 eV was employed in the integration to speed up the convergence. The conjugate gradient algorithm was used in optimization, allowing the convergence of $10^{-4}$ eV in total energy and $10^{-3}$ eV Å$^{-1}$ in Hellmann-Feynman force on each atom. All atoms were allowed to relax except those of the bottom two layers that were fixed at the hcp Ru bulk position with the optimized lattice constant of a=b=2.731 and c=4.307 Å. Simulated XRD spectra were obtained using Reflex module embedded in Materials Studio 5.5 by Accelrys [http://accelrys.com/products/materials-studio/] with X-ray source being synchrotron beam (λ=0.3196 Å) as in the experimental measurements, step size of 0.01°, and Pseudo-Voigt broadening of 0.1°.

Water Electrolysis Tests

In-house deionized water was used for all water electrolysis testing. All testing was conducted using a custom test station fabricated at Proton OnSite (Proton) for characterization of cell materials. The test station used an integrated water purification module, which maintained on-board conductivity near 18 MΩcm. Temperature control was regulated by a Teflon coated submersible heater and all operational tests were conducted at 50° C. Commercially available fuel cell stack test hardware was modified for electrolysis testing by replacing carbon flow fields on the anode side of the cell with titanium flow fields designed and fabricated at Proton. This test cell hardware has been validated versus Proton's commercially available stack designs, in order to predict full-scale operational performance. A current control Sorensen power supply was used to power the cell stack, with over current protection set at 2.0 A cm$^{-2}$. Current was adjusted through the scan region and allowed to stabilize for 5 minutes before collecting cell potential measurements.

Fuel Cell Tests

Fuel cell acceleration stress tests (ASTs) for the anodes were carried out on membrane electrode assemblies (MEAS) with an active electrode area of 45 cm$^2$. The cathode catalyst was Pt/C (Pt loading: 0.4 mg cm$^{-2}$), the membrane was Nafion®211, and the GDLs were obtained from Ballard Material Products (BMP). During the AST, the fuel cell was alternated between operating (1 A cm$^{-2}$) and shutdown modes, with the anode potential cycled between ~0.02 V and ~0.95 V, and the cathode potential cycled between ~0.55 V and ~0.93 V (13). In-situ cyclic voltammetry measurements for CO stripping were performed using CorrWare software with a PAR Model 263A potentiostat connected to a 20-A Kepco power booster, by flowing hydrogen on the cathode (acting as a pseudo hydrogen reference electrode) and nitrogen on the anode.

Structure Characterization of Ru@Pt Nanoparticles

Figure 2:
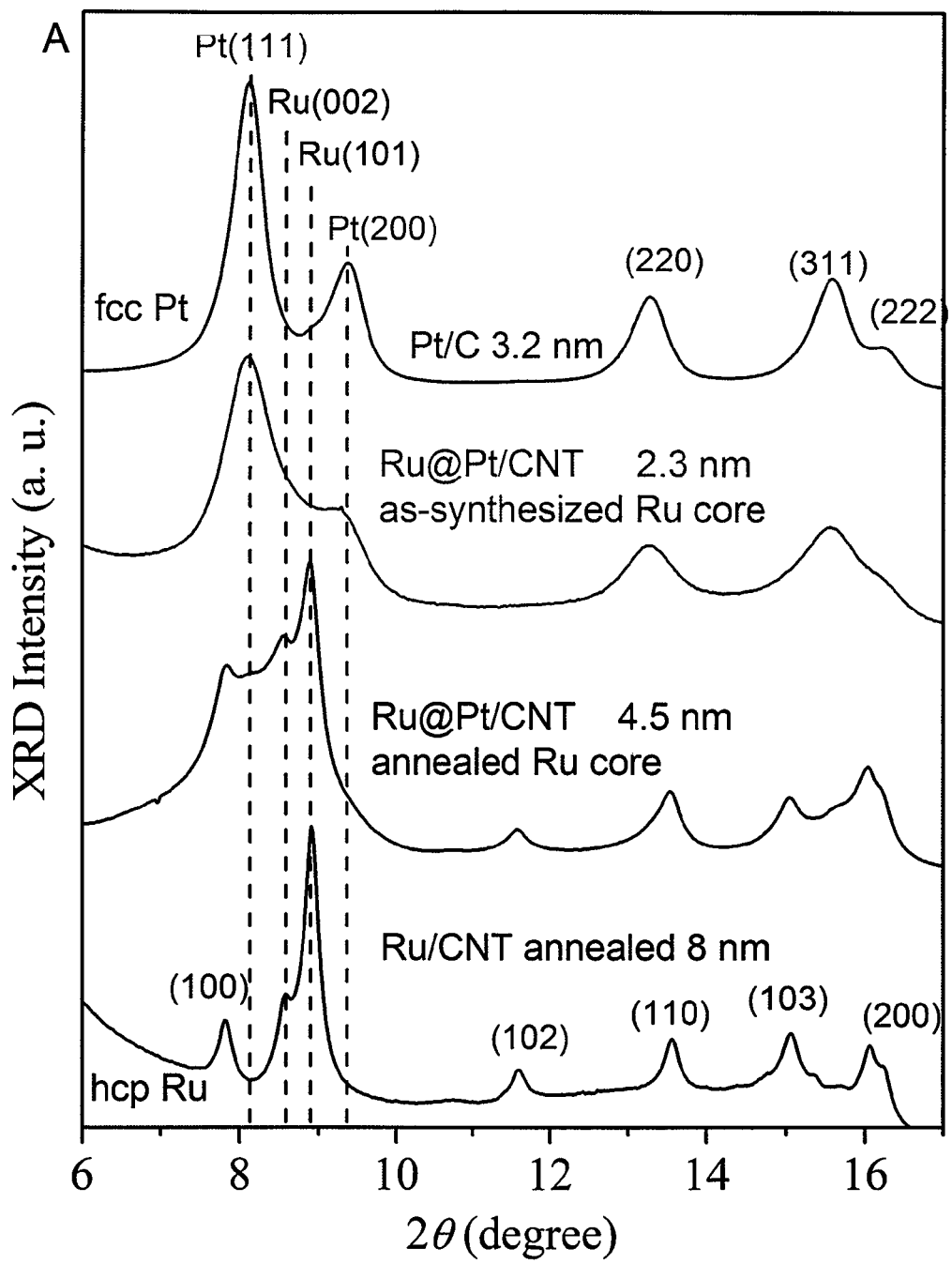
FIG. 2 depicts XRD intensity profiles showing, respectively, fcc-dominant and hcp-dominant structures for 1:1 Ru@Pt nanoparticles made with as-synthesized Ru cores and annealed cores.
Figure 3:
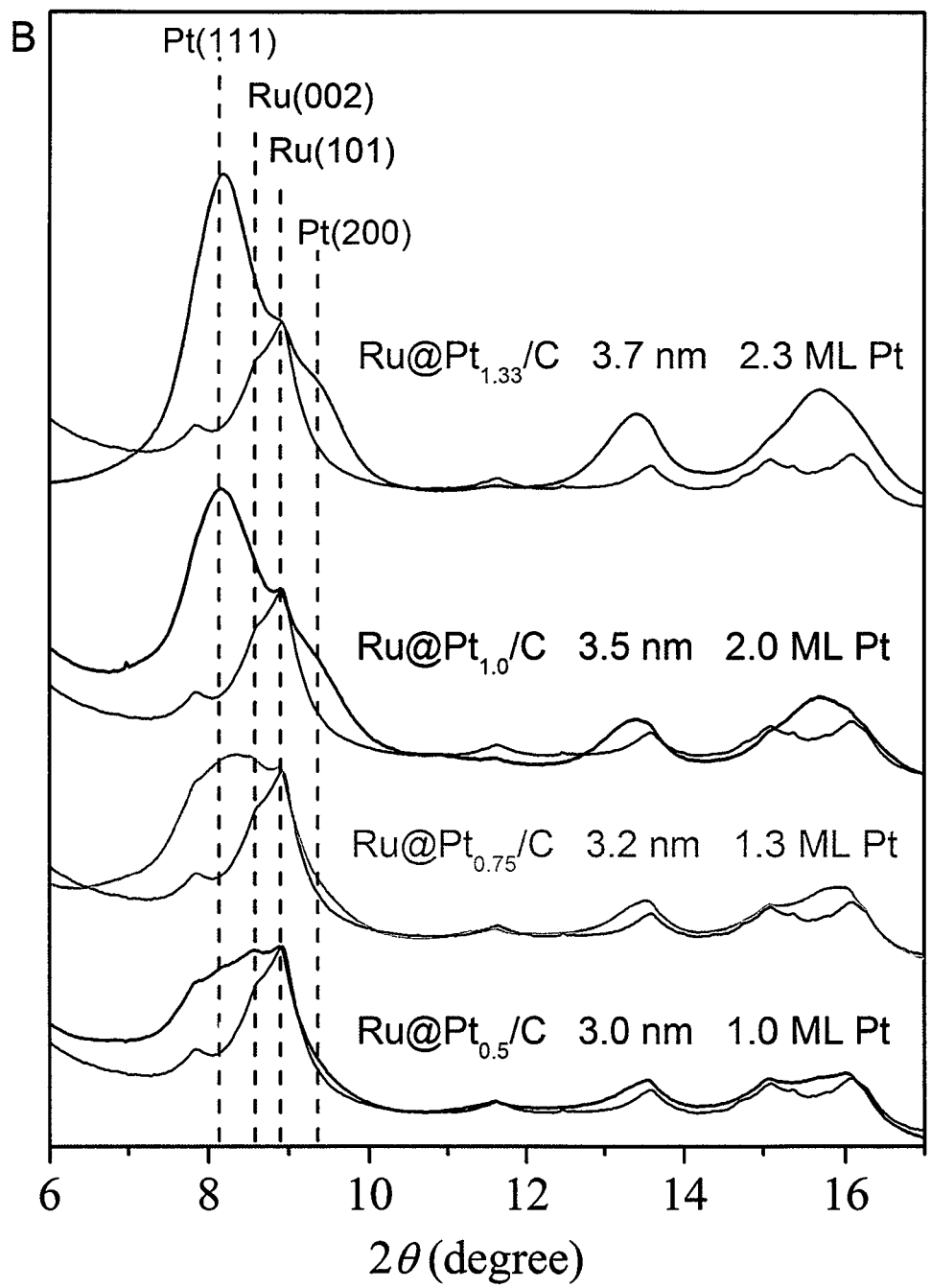
FIG. 3 depicts XRD intensity profiles for Ru@Pt/C samples made with annealed Ru cores and the Pt:Ru ratio increasing from 0.5 to 1.33.

In FIG. 1 XRD intensity profiles are provided which show, respectively, the fcc-dominant and hcp-dominant structures for the 1:1 Ru@Pt nanoparticles made with as-synthesized Ru cores and annealed cores. The curves for pure Ru nanoparticles on carbon nanotube support, Ru/CNT, and Pt nanpoarticles on carbon powder support, Pt/C, are plotted as references. FIG. 2 XRD provides intensity profiles for the Ru@Pt/C samples made with annealed Ru cores and the Pt:Ru ratio increasing from 0.5 to 1.33. The curve for annealed Ru cores is also plotted for reference, and the intensities of the Ru@Pt/C curves are normalized to the annealed Ru core curve at the Ru(101) position. The average particle sizes were estimated by TEM measurements (FIG. 3) and the average Pt shell thicknesses in number of monolayer (ML) were calculated from particle size and Ru:Pt atomic ratio assuming a well-defined core-shell structure.

Ru(hcp) and Pt(fcc), both consist of closely packed planes of atoms, differing in their stacking sequence: The hcp layers cycle between two shifted positions, expressed as ABAB, whereas the fcc layers cycle between all three equivalent shifted positions, i.e., ABCABC. Their distinctive features in the XRD spectra (Seen in FIG. 2) have been used in previous studies to distinguish the Ru@Pt core-shell nanoparticles, synthesized by using a sequential polyol process at 200° C., from the RuPt alloy nanoparticles. A similar XRD profile was obtained for the Ru@Pt sample prepared with the as-synthesized Ru cores. It differs from that for pure Pt nanoparticles by the notable intensity between the fcc Pt (111) and (200) peaks, originating from the hcp Ru (002) and (101) diffractions. Because of the relative weakness of the hcp diffractions, the Ru cores were considered to be highly disordered.

With the annealed Ru cores, the average particle size of ethanol-synthesized Ru@Pt nanoparticles increased and the XRD spectra yielded features corresponding to well-ordered hcp-Ru cores (See FIG. 2). With the same 1:1 Ru:Pt atomic ratio, we obtained hcp-dominant XRD spectra on Ru@Pt/CNT samples that have an average particle size 4.5 nm. Furthermore, four Ru@Pt/C samples were prepared with different Ru:Pt atomic ratios and using as cores the annealed Ru nanoparticles. The XRD spectra are plotted in FIG. 2 with the intensity normalized at the Ru(101) peak position with that for the Ru nanoparticles before coating them with Pt. The intensities at the fcc-(111) and fcc-(200) positions increase with a rise in the Pt:Ru atomic ratio. These results suggest that well-defined Ru@Pt core-shell nanoparticles have been synthesized via controlled Pt coating in ethanol.

Figure 4:
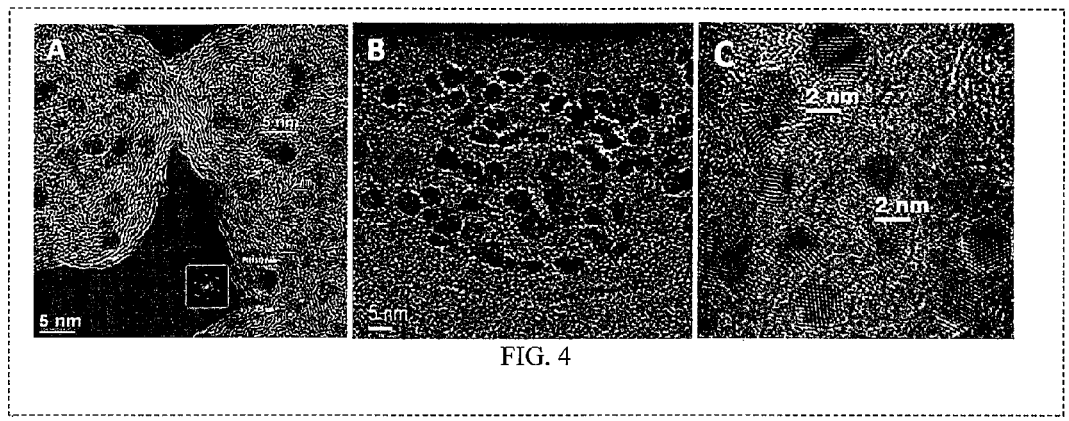
FIG. 4 depicts TEM images for the 1:1 Ru@Pt nanoparticles on (A) as-synthesized Ru/C, (B) annealed Ru/CNT, and (C) annealed Ru/C.

The core-shell elemental distribution was verified at the atomic scale using various (scanning) transmission electron microscopy ((S)TEM) techniques including a high angle annular dark-field (HAADF)-STEM, high-resolution TEM, and electron energy-loss spectroscopy (EELS). FIG. 4 shows the intensity profiles in a line scan across a near-sphere Ru@Pt nanoparticle, wherein the EELS signal for Ru indicates a 4.2 nm Ru core inside a 5.7 nm NP, as measured by the HAADF. The Pt shell is about 3-ML thick, as is expected for 1:1 Ru@Pt nanoparticles with an average diameter of 5.5 nm.

For the well-defined Ru@Pt core-shell nanoparticles, the atomic structure at the hcp fcc was studied interface using density functional theory (DFT) calculations, and high-resolution STEM. Focusing on the effect of the stacking sequence, slab models were used composed of four Ru layers and one or two Pt layers with a (2×2) hexagonal array within each layer. The atoms in the Pt layers and the top two Ru layers were relaxed. For a Pt monolayer, it was found that the energy is slightly lower for the Ru(AB AB)-Pt(C) sequence (−33 meV) than for that of Ru(ABAB)-Pt(A) (Tables 1 and 2).

TABLE 1

DFT calculated energy differences for slab models with various stacking sequences.

| Stacking sequence models | $\Delta E$ (meV) vs. ABAB sequence |
|---|---|
| Ru-Pt monolayer | |
| ABAB-A | 0 |
| ABAB-C | −33 |
| Ru-Pt bilayer | |
| Normal Ru hcp layers | |
| ABAB-AB | 0 |
| ABAB-AC | −160 |
| ABAB-CA | −134 |
| ABAB-CB | 25 |
| Top Ru layer shifted | |
| ABAC-BA | 466 |
| ABAC-AB | 612 |
| Ru-RuPt partial alloy | |
| AB-ACBA alloy vs. ABAB-AB bilayer | 1000 |
| AB-ACBA alloy vs. AB-ABAB alloy | −250 |

TABLE 2

Lattice strain in the Ru cores and Pt shells deduced from the refinement of the XRD spectra in FIG. 2.

| Ru@Pt NP samples | Ru (101) d (Å) | Strain in core % vs. $d_{bulk}$ = 2.056 | Pt (111) d (Å) | Strain in shell % vs. $d_{bulk}$ = 2.263 |
|---|---|---|---|---|
| RuPt$_{0.5}$/C 3.0 nm | 2.057 | 0.05 | 2.242 | −1.02 |
| RuPt$_{0.75}$/C 3.2 nm | 2.056 | 0.0 | 2.243 | −0.97 |
| RuPt$_{1.0}$/C 3.5 nm | 2.058 | 0.1 | 2.25 | −0.66 |
| RuPt$_{1.33}$/C 3.7 nm | 2.058 | 0.1 | 2.242 | −1.02 |
| RuPt$_{1.0}$/CNT 4.5 nm | 2.061 | 0.24 | 2.251 | −0.62 |

Figure 5:
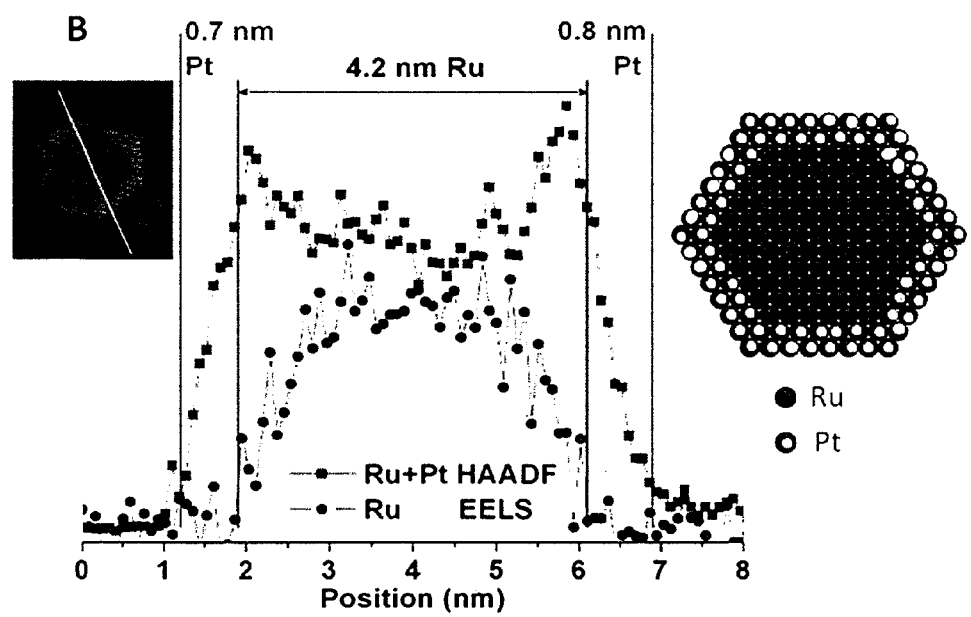
FIG. 5 depicts high-resolution STEM image and line-scan profiles of STEM-HAADF and Ru-EELS for a well-defined Ru@Pt nanoparticle made using annealed Ru/CNT, and depicts a schematic model for the corresponding partial-alloyed and well-defined Ru@Pt NPs, respectively, made using, as-synthesized and annealed Ru cores.

Adding the second Pt layer with two choices for each type of monolayer creates four possible stacking sequences. The DFT calculations revealed that two of them have lower energies than the all-hcp Ru(ABAB)-Pt(AB) sequence. One is the Ru(ABAB)-Pt(AC) sequence (−160 meV); the other is the Ru(ABAB)-Pt(CA) sequence (−134 meV). FIG. 5 depicts their structural models. Exploration of both structures via high-resolution STEM denoted that the former is characterized by having three (2 Pt and 1 Ru) top layers involved in the fcc sequence (the atoms in these layers align along the triangular lines), and with five (1 Pt and 4 Ru) layers in the hcp sequence (the atoms in the rectangle at every other layer aligned vertically). For the Ru(ABAB)-Pt (CA) sequence, the fcc triangle includes four (2 Pt and 2 Ru) top layers, while the hcp rectangle has four Ru layers.

Figure 6:
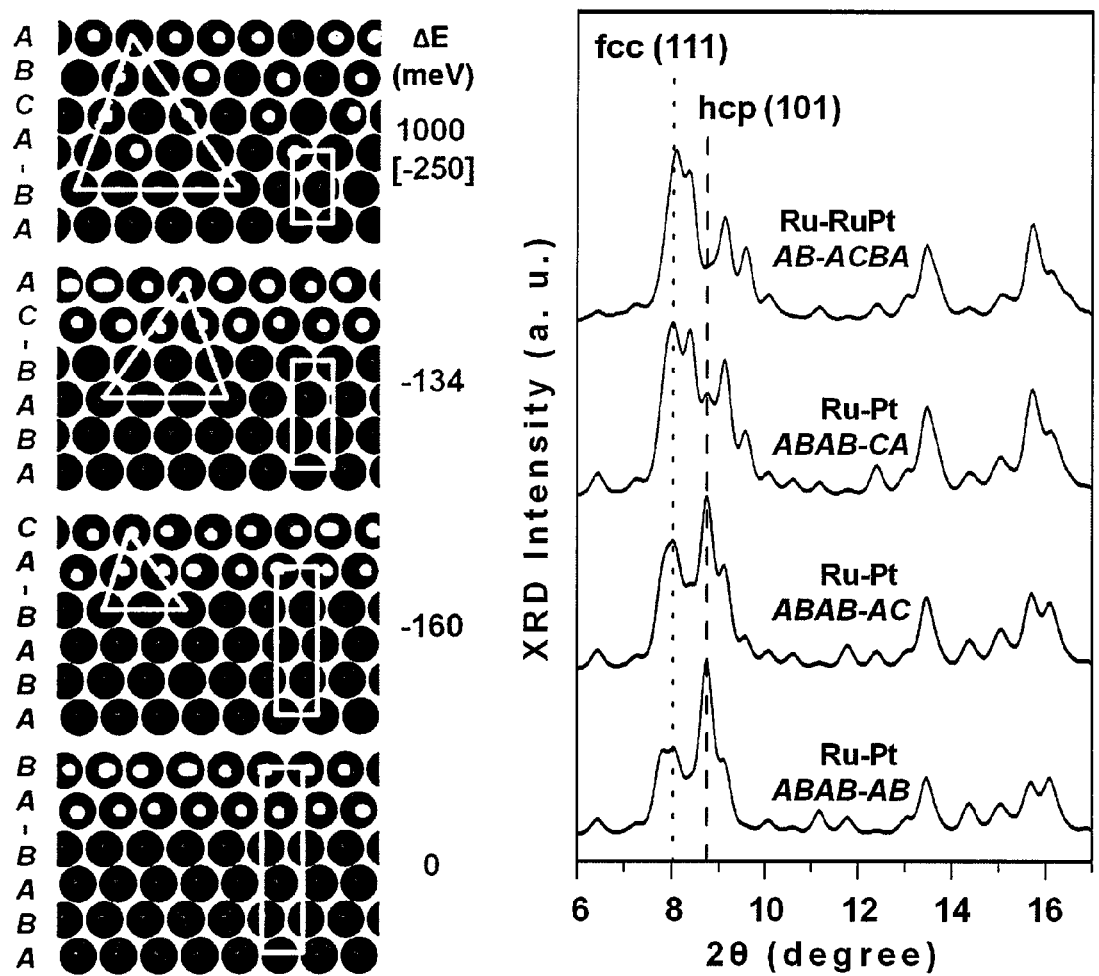
FIG. 6 depicts favorable stacking sequences for two layers of Pt on four layers Ruslab models with four atoms in a (2×2) hexagonal cell in each layer. The differences in energy, ΔE, are given relative to the bilayer model with the all-hcp sequence, Ru(ABAB)-Pt(AB), shown at the bottom. The additional ΔE value in square bracket for the partially-alloyed model at the top is with respect to the partially-alloyed model with all-hcp sequence, i.e., Ru(AB)-RuPt (ABAB). The numbers of layers involved in fcc-ABC and hcp-AB sequences are highlighted, respectively, by the triangles and rectangles, and depicts (Right panel) XRD spectra generated using the corresponding structural models to illustrate the effect of the stacking sequence on the relative intensities at the fcc-(111) and hcp-(101) positions. Atomic factors and the effects of lattice stain and particle size are not included.

DFT-optimized structures were compared with high-resolution STEM images for the Ru@Pt nanoparticles in the specified crystallographic orientations. In FIG. 6, one image for a Ru@Pt/CNT sample matches well with the Ru(ABAB)-Pt(AC) sequence, while another other agrees with the Ru(ABAB)-Pt(CA) sequence. Since the boundary between Ru core and Pt shell is not always apparent, it can be questioned whether the top Ru layer could be shifted from the normal A sites to the C sites by interaction with Pt layers. It has been found that this scenario is unlikely because the energy cost for such a shift is high, 466 or 612 meV, as listed in Table 1. Therefore, the observed images are well described by the DFT-optimized structural models, confirming the formation of well-defined, highly ordered Ru@Pt core-shell nanoparticles.

Catalytic Performances of Ru@Pt Nanoparticles

Figure 7:
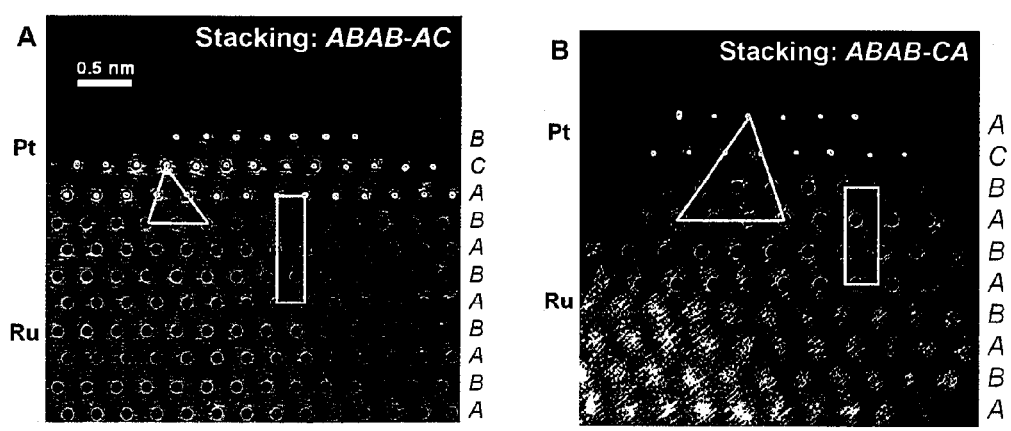
FIG. 7 depicts high-resolution STEM images of Ru@Pt NPs with 2 to 3 Pt atomic layers on hcp Ru cores. The numbers of layers involved in fcc-ABC and hcp-AB sequences are highlighted, respectively, by the triangles and rectangles. The stacking sequence at the interface is ABAB-AC(B) in (A), and ABAB-CA in (B).

For hydrogen evolution in water electrolyzers, the best performance was obtained using a 1:1 ratio Ru@Pt/C nanocatalysts with bilayer-thick Pt shells. FIG. 7 compares the polarization curve of such a catalyst measured with a standard baseline. A lower cell voltage signifies that electricity is used more efficiently on a better catalyzed electrode. The nearly-overlapping polarization curves denote the achievement of a same performance with a reduction of Pt loading by 99% (0.022 versus 3.0 mg cm$^{-2}$). In addition to the high Pt surface area per mass (~1 cm$^2$ μg$^{-1}$) of the core-shell nanoparticles, optimized carbon support and well-fabricated gas diffusion electrodes also are vital for assuring the high activity at ultralow metal loadings.

Figure 8:
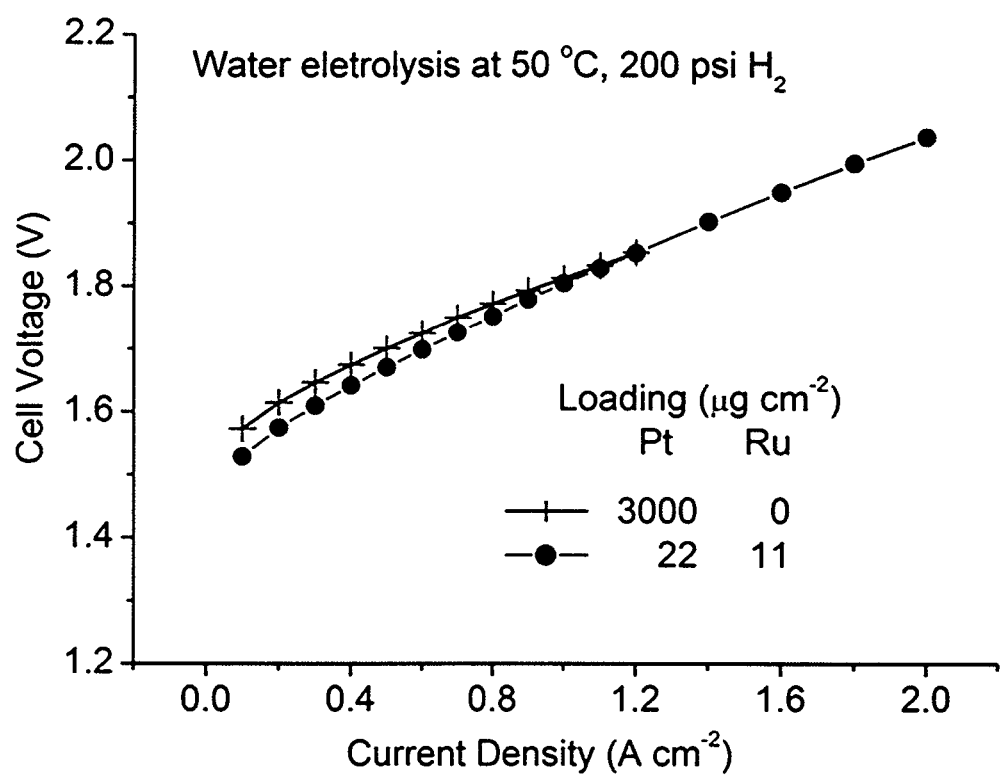
FIG. 8 depicts polarization curves for water electrolysis using Ru@Pt/C nanocatalysts at the cathode, showing a similar performance with a 99% reduction of Pt loading.
Figure 9:
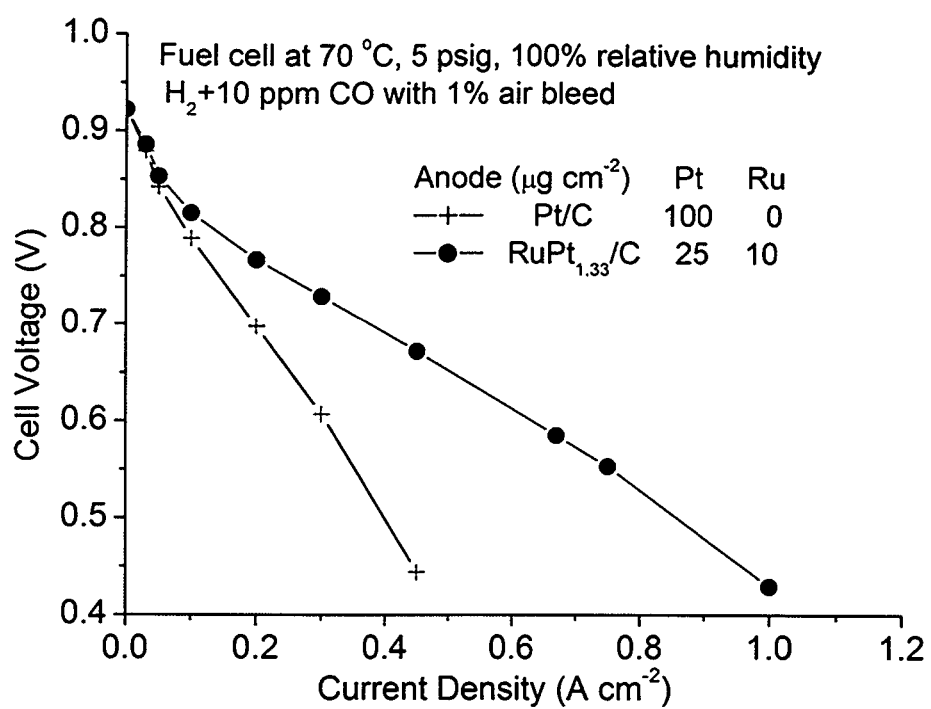
FIG. 9 depicts fuel cell tests showing the better CO tolerance of the Ru@Pt$_{1.33}$/C core-shell nanocatalysts than that of Pt/C.

FIG. 8 shows the polarization curves measured with $H_2$+10 ppm CO+1% air bleed, wherein Ru@Pt1.33/C performed better than Pt/C. This may be attributed to the enhanced CO tolerance to the weakened CO adsorption on the Pt shell (2-3 atomic layer thick), as evidenced by the lack of a sharp CO stripping peak compared with that for Pt nanoparticles (FIG. 9). DFT calculations illustrated the weakened adsorption induced by lattice contraction. It was found that Pt shells contracted by −0.62% to −1.0% based on the XRD analyses (Table 2), largely due to the lattice mismatch between Ru and Pt.

Figure 10:
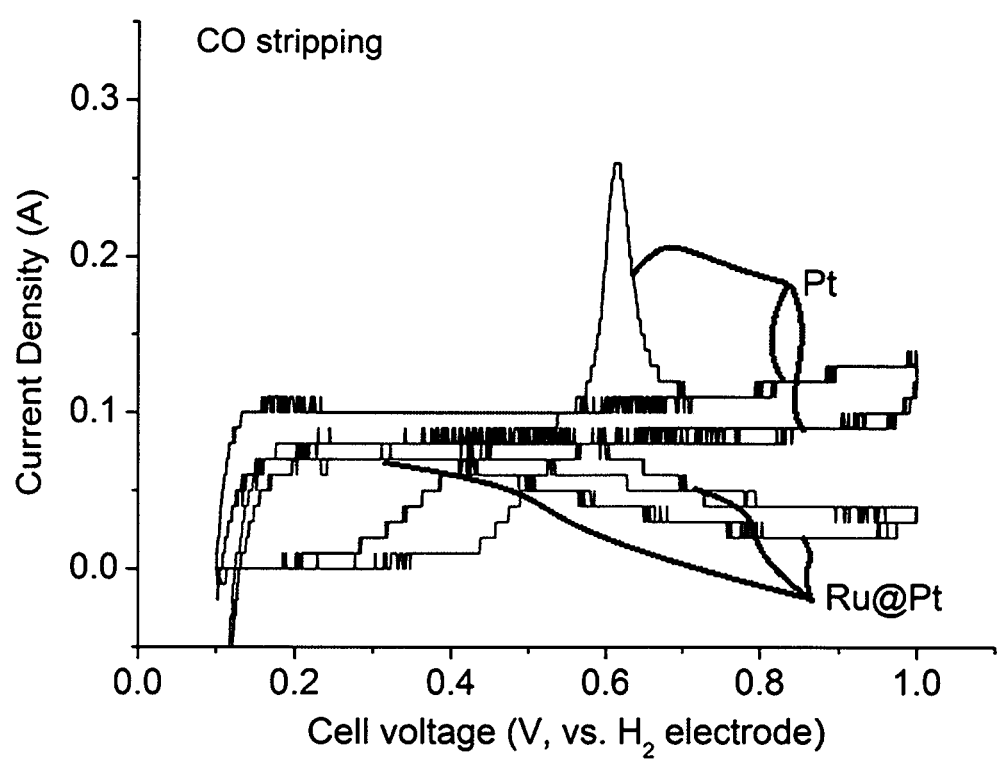
FIG. 10 depicts fuel cell tests showing diminishing CO stripping peak on Ru@Pt core-shell NPs, sweep rate 20 mV s$^{-1}$.

In previously used RuPt/C catalysts Ru may dissolve at occasional high potentials during the starts and stops of fuel cells. Ru ions can migrate through membrane to the cathode side; the re-deposited Ru depresses the cathode activity for oxygen reduction, and thus, lowers the cell voltage. A well-ordered core-shell structure enhances dissolution resistance by assuring the Ru core is covered completely with a Pt shell that itself is more resistant to dissolution than Pt nanoparticles due to Ru-induced lattice contraction. FIG. 10 shows the results of accelerated stress test for the Ru@Pt$_{1.33}$/C catalyst. After 2500 start/stop cycles that alternated the anode potential between 0.02 and 0.95 V, there were only minor losses in cell voltages. The sustained activities at ultralow PGM loadings signify that structural perfection matters for high activity and stability in practical applications.

Structure Characterization of Pd@Pt Nanoparticles

Figure 11:
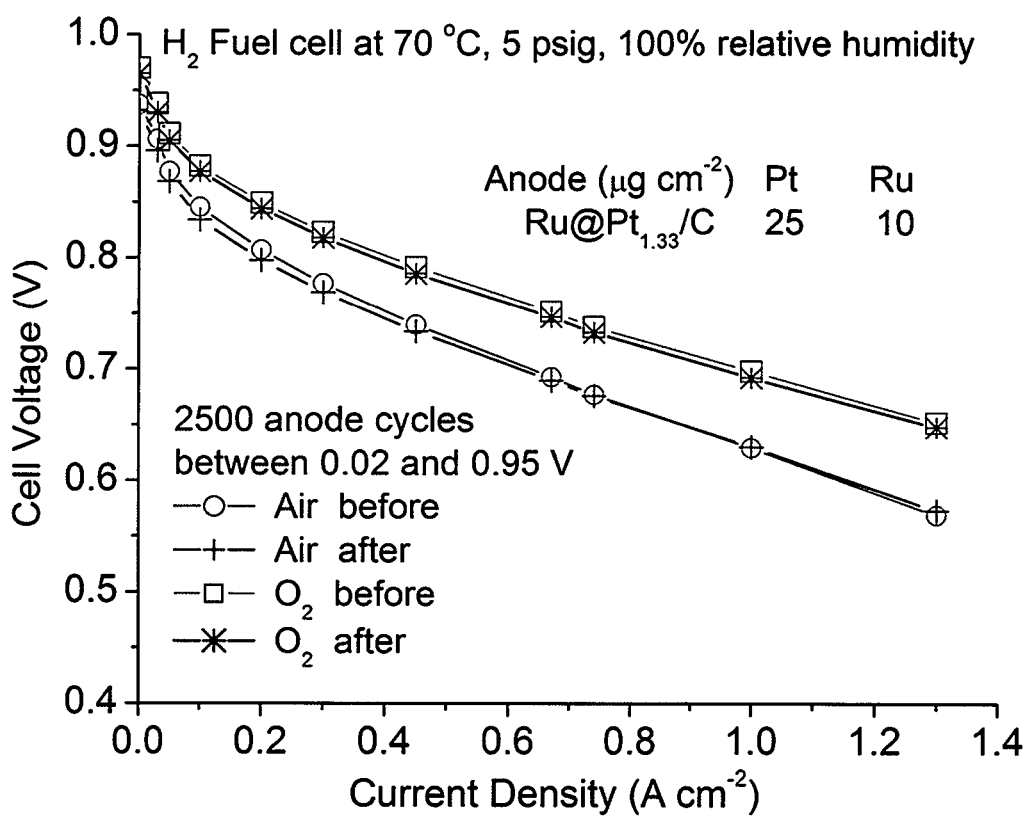
FIG. 11 depicts fuel cell tests showing performance stability against anode potential cycling.

Referring now to FIG. 11, for two distinct samples (dots and squares) with different starting amount of $H_2PtCl_6$ precursor in synthesis, the measured Pt/(Pt+Pd) atomic ratios decreased with the increasing particle size. The trend largely followed the curves calculated for monolayer- and bilayer-thick Pt shells on Pd cores, respectively (solid and dash lines). The calculation was based on a cuboctahedron model and the normal distribution of particle size (SI, experimental section). These results denoted that the conformal and smooth Pt shell could be epitaxially fabricated with variable thickness on Pd cores, simply by adjusting the amount of $H_2PtCl_6$ used in syntheses. The exclusive deposition of Pt atoms on Pd cores was verified by the two-dimensional (2D) intensity mapping using scanning transmission electron microscopy (STEM) technique. In addition, the Pt/(Pt+Pd) atomic ratios were determined by energy dispersive X-ray spectroscopy (EDX) for individual particles. No particles were found without the existence of Pd, indicating that the self-nucleation of Pt has been effectively prevented. Furthermore, a nearly 100% yield was also verified by the very good agreement of Pt and Pd weight percentages in the final products measured by inductively coupled plasma mass spectrometry (ICP-MS) and by EDX equipped on a scanning electron microscope (SEM), with those calculated from the precursor amounts used in syntheses.

Catalytic Performances of Pd@Pt Nanoparticles

Figure 12:
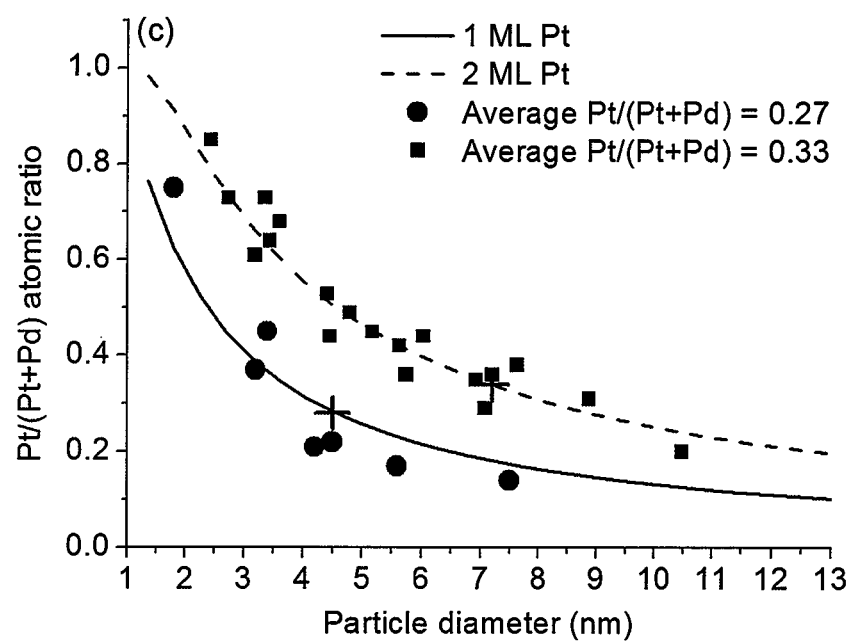
FIG. 12 depicts EDX-determined Pt/(Pt+Pd) atomic ratio as a function of particle size for two distinct samples, showed by dots and squares, compared to the calculated curves for monolayer (solid) and bilayer (dash) of Pt on Pd nanoparticles.
Figure 13:
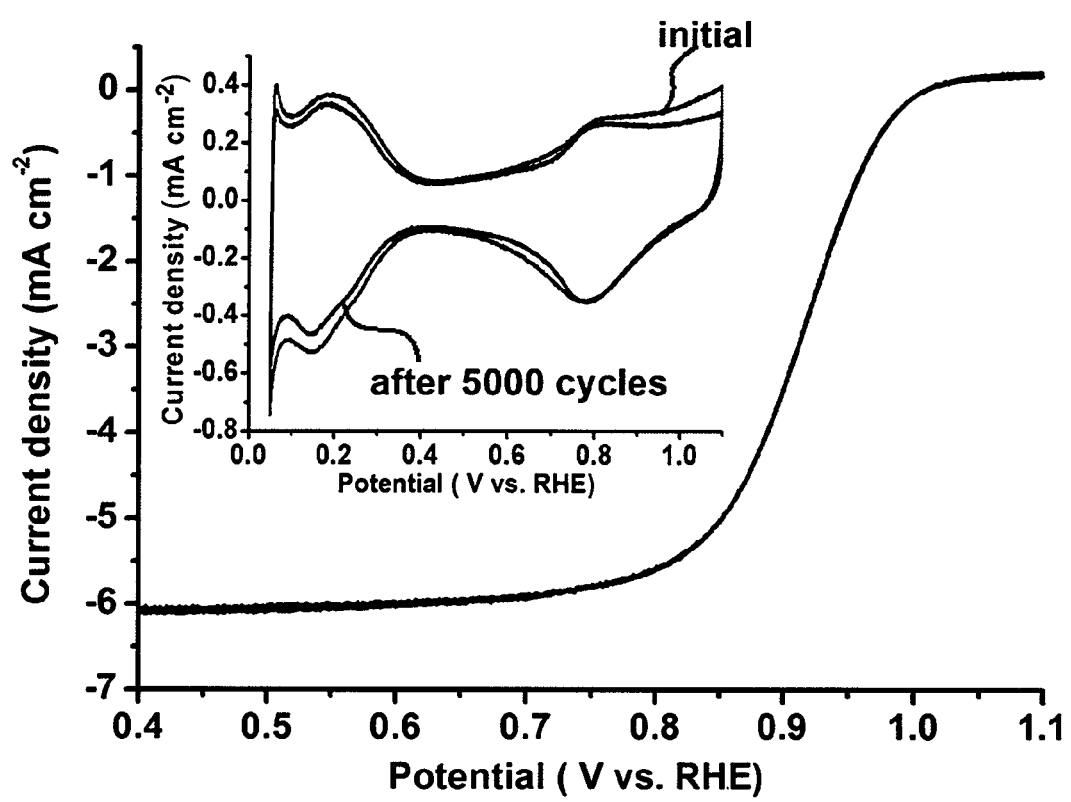
FIG. 13 depicts oxygen reduction reaction polarization (10 mV s$^{-1}$) and cyclic voltammetry (inset) curves (50 mV s$^{-1}$) obtained on a Pd@Pt$_{ML}$ sample before and after 5000 pulse potential cycles, 0.6 V (10 s)-1.0 V (10 s).

The uniform and smooth Pt shell was further inferred from the stable oxygen reduction reaction activity measured for a Pd@Pt core shell nanoparticles sample after pulse-potential stability test (FIG. 12). As shown in FIG. 12, after 5000 cycles of potential pulses (10 s at 0.6 V and at 1.0 V each), the oxygen reduction reaction polarization curve remained unchanged, and the cyclic voltammetry curve showed negligible loss of electrochemical surface area.

Table 3 summarises the oxygen reduction reaction activities for Pd@Pt$_{ML}$ and Pd@Pt$_{2ML}$ fabricated by the ethanol-based approach, compared with those for Pd@Pt fabricated by a scale-up Cu underpotential deposition (UPD) method. The complete and smooth Pt surface formed at 80° C. by ethanol led to smaller electrochemical surface area than that formed at room temperature by scale-up Cu UPD method. Pd@PtML fabricated by two distinct methods exhibited similar mass activity (normalized by Pt or PGM mass), indicating the ethanol-based route was an effective large-quantity synthetic method to produce Pt monolayer catalysts.

TABLE 3 oxygen reduction reaction activities for Pd@Pt$_{ML}$ and Pd@Pt$_{2ML}$

| catalysts | Cu UPD 1 ML Pt | EtOH Pd@Pt$_{ML}$ | EtOH Pd@Pt$_{2ML}$ |
|---|---|---|---|
| Pt/(Pt + Pd) atom ratio | 0.27 | 0.27 | 0.33 |
| Pt (wt %) | 16.5 | 17.1 | 18.1 |
| Pd (wt %) | 24.5 | 24.9 | 19.7 |
| MA$_{Pt}$ (A mg$^{-1}$) | 0.62 | 0.64 | 0.62 |
| MA$_{PGM}$ (A mg$^{-1}$) | 0.25 | 0.26 | 0.30 |
| SA (mA cm$^{-2}$) | 0.32 | 0.58 | 0.70 |
| ECSA (m$^2$ g$^{-1}$) | 191 | 110 | 89 |

It should be apparent to those skilled in the art that the described embodiments of the present invention provided herein are illustrative only and not limiting, having been presented by way of example only. As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto.

The invention claimed is:

1. A method for producing atomically ordered core-shell nanoparticles, the method comprising:
   dissolving a first metal salt in ethanol;
   heating the combination of the first metal salt and the ethanol to a first temperature sufficient to partially reduce first metal ions of the first metal salt;
   adding an alkaline solution, to further reduce the first metal ions, thereby causing precipitation of disordered nano article cores;
   annealing the disordered nanoparticle cores to form atomically ordered nanoparticle cores;
   combining the atomically ordered nanoparticle cores and a second metal salt with ethanol;
   heating the combination of the atomically ordered nanoparticle cores, second metal salt, and the ethanol to a second temperature high enough to reduce second metal ions of the second metal salt onto the atomically ordered nanoparticle cores and form a conformal shell of the second metal around the atomically ordered nanoparticle cores.

2. The method of claim 1, wherein the second temperature is sufficiently low to prevent formation of second metal nanoparticles.

3. The method of claim 1, wherein the conformal shell is an atomic monolayer, bilayer, or trilayer.

4. The method of claim 1, wherein the annealing is performed in hydrogen or hydrogen mixed with inert gas at between about 350° C. and about 500° C. for about 0.5 hours to about 3 hours.

5. The method of claim 1, wherein the first metal salt comprises a salt of a metal chosen from the group consisting of Ru, Rh, Pd, Os, Ir, Pt, Au, and combinations thereof.

6. The method of claim 5, wherein the second metal salt comprises a salt of a metal chosen from the group consisting of Ru, Rh, Pd, Os, Ir, Pt, Au, and combinations thereof, wherein a first metal of the first metal salt and a second metal of the second metal salt are not the same.

7. The method of claim 6, wherein the second metal salt comprises Pt.

8. The method of claim 7, wherein the second metal salt is chloroplatinic acid hexahydrate.

9. The metal of claim 7, wherein the first metal salt comprises Ru.

10. The metal of claim 7, wherein the first metal salt comprises Pd.

11. The method of claim 1 wherein the second temperature is between about 50° C. and about 80° C.

* * * * *